United States Patent

Ahn et al.

[11] Patent Number: 5,911,026
[45] Date of Patent: Jun. 8, 1999

[54] WEDGE-SHAPED BINDING APPARATUS FOR OPTICAL FIBER CABLE SPLICE CLOSURE

[75] Inventors: Bo Young Ahn, Incheon; Sung Chil Jo, Kyungki-do, both of Rep. of Korea

[73] Assignee: Daewoo Telecom Ltd., Incheon, Rep. of Korea

[21] Appl. No.: 09/027,984

[22] Filed: Feb. 23, 1998

[30] Foreign Application Priority Data

Feb. 21, 1997 [KR] Rep. of Korea .......................... 97-2685

[51] Int. Cl.$^6$ ....................................................... G02B 6/00
[52] U.S. Cl. ............................ 385/134; 385/136; 385/135
[58] Field of Search ..................................... 385/134, 135, 385/136, 137, 138, 139

[56] References Cited

U.S. PATENT DOCUMENTS 5,568,584 10/1996 Smith ........................................ 385/135
5,850,499 12/1998 Sasaki et al. ............................. 385/135

Primary Examiner—Phan T. H. Palmer
Attorney, Agent, or Firm—Lilling & Lilling, P.C.

[57] ABSTRACT

The present invention relates to a binding apparatus 32, installed it a closure for optical fiber cable splice, comprising an internal binding portion 34a having a first groove 36a, that narrows to the center, on the upside of an end of the closure cover 30 cut lengthwise and a skirt cover 37 for covering a skirt 38 formed at the opposite end of the closure cover 30 cut lengthwise; an external binding portion 34b having a second groove 36b, that narrows to the center corresponding to the first groove 36a, on the downside of the opposite end of the closure cover 30 cut lengthwise, and a skirt 38 inserted into the skirt cover 37 of the internal binding portion 34a; wedge-shaped bars 50a and 50b, inserted through both ends of holes formed by the first and second grooves 36a and 36b when they come in contact with each other to hold both ends of the internal and external binding portions 34a and 34b, having a clamping bar hole 52 perforated lengthwise through the middle of the bar; and a fixing means for fixing the wedge-shaped bars 50a and 50b inserted into the holes formed by the first and second grooves when they come in contact with each other, thus covering the closure for optical fiber cable splice tightly to keep the binding state firm and stable, and facilitating assembling and disassembling of the closure by means of the wedge-shaped bars 50a and 50b.

5 Claims, 5 Drawing Sheets

WEDGE-SHAPED BINDING APPARATUS FOR OPTICAL FIBER CABLE SPLICE CLOSURE

BACKGROUND OF THE INVENTION

1. Field of the Invention

The present invention relates to a closure for optical fiber cable splice, and more particularly relates to a wedge-shaped binding apparatus for an optical fiber cable splice closure that covers the closure for optical fiber cable splice tightly to protect the optical fiber cables connected in the closure from moisture and shock from the outside.

2. Discussion of Related Art

Light communications, constructed with optical fiber cables, can transmit information hundreds of thousands times as much as the conventional electric communications using copper cables. Accordingly, the optical fiber cables are applied so much in the present communications field because they are not affected by any radio waves and magnetic forces from the outside, and the application range of optical fiber cables is increasingly extended to the other related fields. These cables are installed underground or in the air, and can be installed at sea bottom to connect continents with one another or islands with the land. Even it is desired to be installed on uncut cables from the starting point to the terminal point in a body, however, since the line of optical fiber cable is extended to several kilometers or longer, it is required to connect and diverge optical fiber cables at intervals. At this time, it is important to obviate light loss that may occur at the joint of the optical fiber cables and protect the cables from environmental influences to keep the connecting state firm and stable. That is, it is necessary to cover the closure for optical fiber cable splice tightly to protect optical fiber cables connected in closure from moisture, shock and tension from the outside. The conventional closure for optical fiber cable splice is composed of end caps that are to receive optical fiber cables at either end of the closure, the end caps are connected with at least more than one connecting bar so as to endure the tension, a closure cover that surrounds the end caps, and a splicer that connects optical fiber cables, etc.

The closure cover has a slot cut lengthwise that facilitates insertion of optical fiber cables and a binding apparatus therewith that opens the inside of the closure when connecting optical fiber cables and binds the closure after connecting, thus protecting optical fiber cables connected therein from moisture.

As shown in FIGS. 1a and 1b which are perspectives showing conventional closures, the conventional closures are to be classified into two types of configuration in general. One is composed of flanges 22a, formed on the slot cut lengthwise, that become wider up to the center, and cover clips 24a, formed to cover the flanges 22a tightly, that are fixed by binding member 26, as shown in FIG. 1a. The other is composed of a plurality of screw bolts 24b that binds the flanges 22b to cover the closure as shown in FIG. 1b. Reference numeral 12 denotes end caps, having cable insertion holes 14, located at either end of the closure.

Meantime, in the binding apparatus that binds the flanges 22a of the closure cover 20a by means of the cover clips 24a, it is impossible to control strength and weakness of binding force since the cover clips 24a are inserted into the flanges 22a and then fixed only by the binding means 26. In addition, it is difficult to cover the closure cover 20a tightly in case that the cover clips 24a become loose or worn for being handled many times, because the binding force of the binding apparatus becomes weak accordingly. And there is a problem that the closure cover 20a becomes bulky as the cover clips 24a cover the flanges protruded outside.

And in the binding apparatus that binds the flanges 22b of the closure cover 20b with a plurality of screw bolts 24b, the trouble is that the binding apparatus should be bolted with a plurality of screw bolts 24b, and the appearance of the closure is not good due to the complicated screw bolts.

SUMMARY OF THE INVENTION

Accordingly, the present invention is directed to a wedge-shaped binding apparatus for an optical fiber cable splice closure that substantially obviates one or more of the problems, limitations, and disadvantages of the related art.

It is the object of the present invention to provide a wedge-shaped binding apparatus for an optical fiber cable splice closure which facilitates assembling and disassembling the closure by means of the binding apparatus using wedge-shaped bars, and diminishes the volume of the closure by minimizing the binding apparatus and at the same time the appearance of the closure become simple as various parts of the binding apparatus are covered into the inside.

To accomplish these and other advantages in accordance with the object of the present invention, there is disclosed a wedge-shaped binding apparatus for optical fiber cable splice closure, in a conventional binding apparatus that covers the closure for optical fiber cable splice in which optical fiber cables are connected and tuned, including an internal binding portion having a first groove on the upside of an end of the closure cover cut lengthwise, and a skirt cover for covering a skirt formed at the opposite end of the closure cover cut lengthwise;

an external binding portion having a second groove on the downside of the opposite end of the closure cover cut lengthwise, corresponding to the first groove, the first and second grooves make holes that narrow to the center when they are mated with each other, and a skirt inserted into the skirt cover of the internal binding portion;

wedge-shaped bars to be inserted into both ends of the hole formed when the first and second grooves are mated with each other to hold both ends of the internal and external binding portions, having a clamping bar hole perforated lengthwise through the middle of the bar; and a fixing means for fixing the wedge-shaped bars inserted into both ends of the holes formed when the first and second grooves are mated with each other.

BRIEF DESCRIPTION OF THE ATTACHED DRAWINGS

DETAILED DESCRIPTION OF PREFERRED EMBODIMENT

Reference will now be made in detail to the preferred embodiments of the present invention, examples of which are illustrated in the accompanying drawings.

Figure 1A:
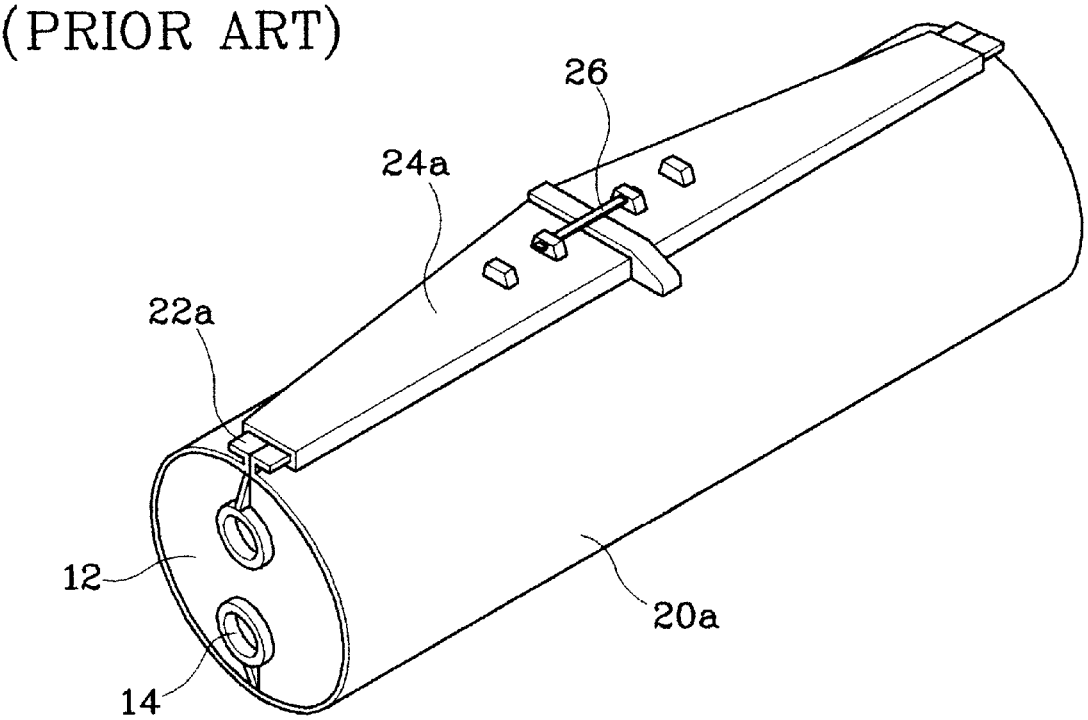
FIGS. 1a and 1b are perspectives showing conventional closures for optical fiber cable splice.
Figure 1B:
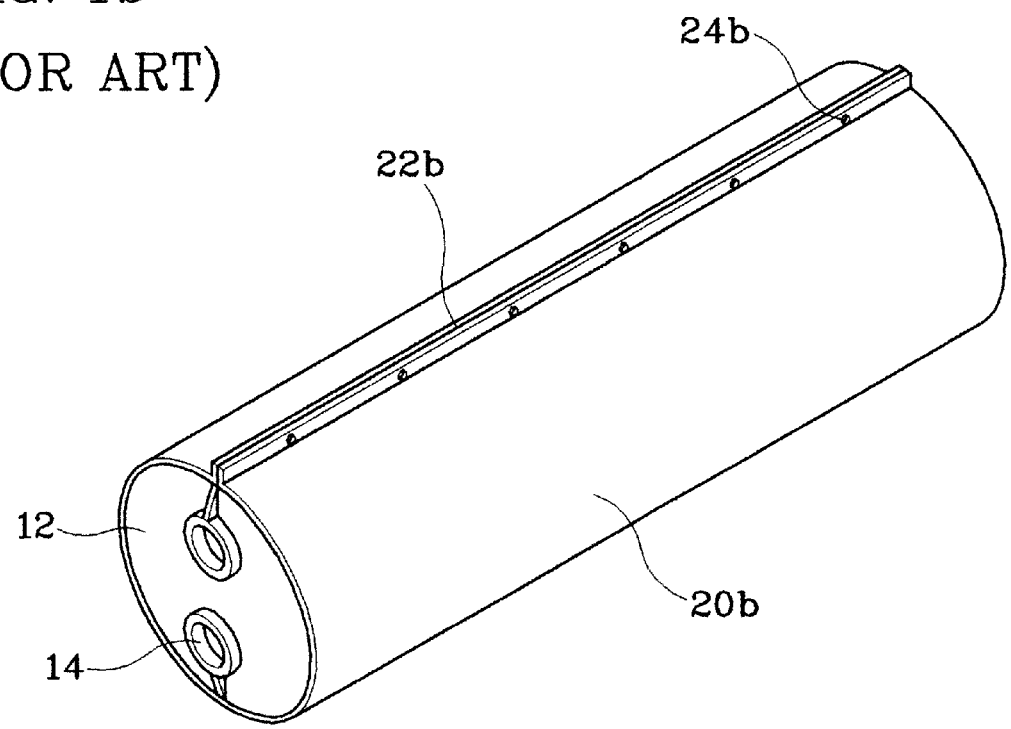
Figure 2:
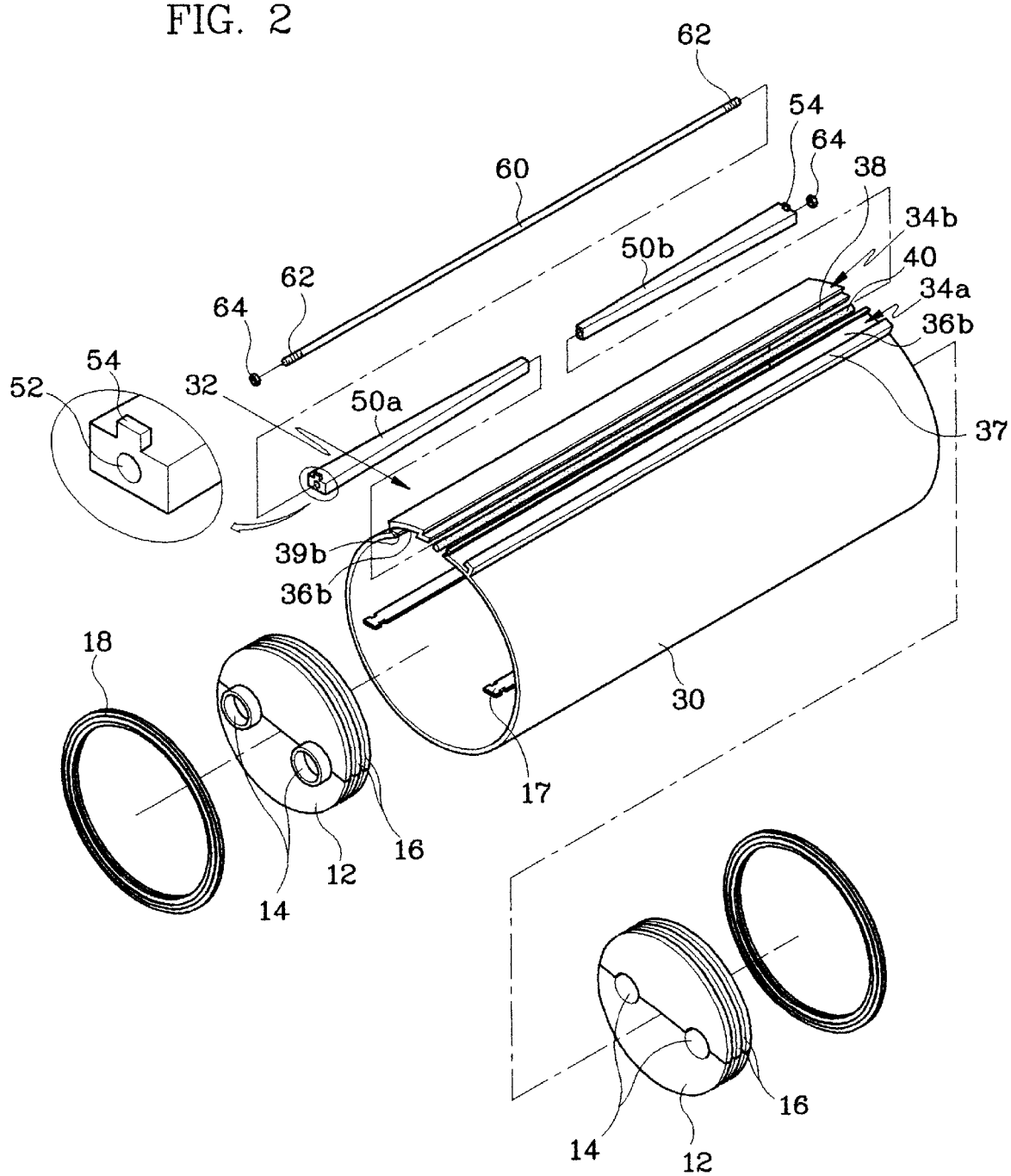
FIG. 2 is an exploded perspective showing a closure for optical fiber cable splice in accordance with the present invention.

As depicted in FIG. 2 showing an exploded perspective of a closure for optical fiber cable splice in accordance with the present invention, the closure is composed of end caps 12 at either side, a closure cover 30 that surrounds the circumference of the end caps 12, and a splicer, not depicted, installed in the closure, for connecting optical fiber cables.

The end caps 12 have end cap grooves 16 on their circumference and cable insertion holes 14 perforated through the end caps. Both end caps 12 are connected with connecting bars 17 and end cap gaskets 18 are installed between the end caps 12 and the closure cover 30.

Figure 3:
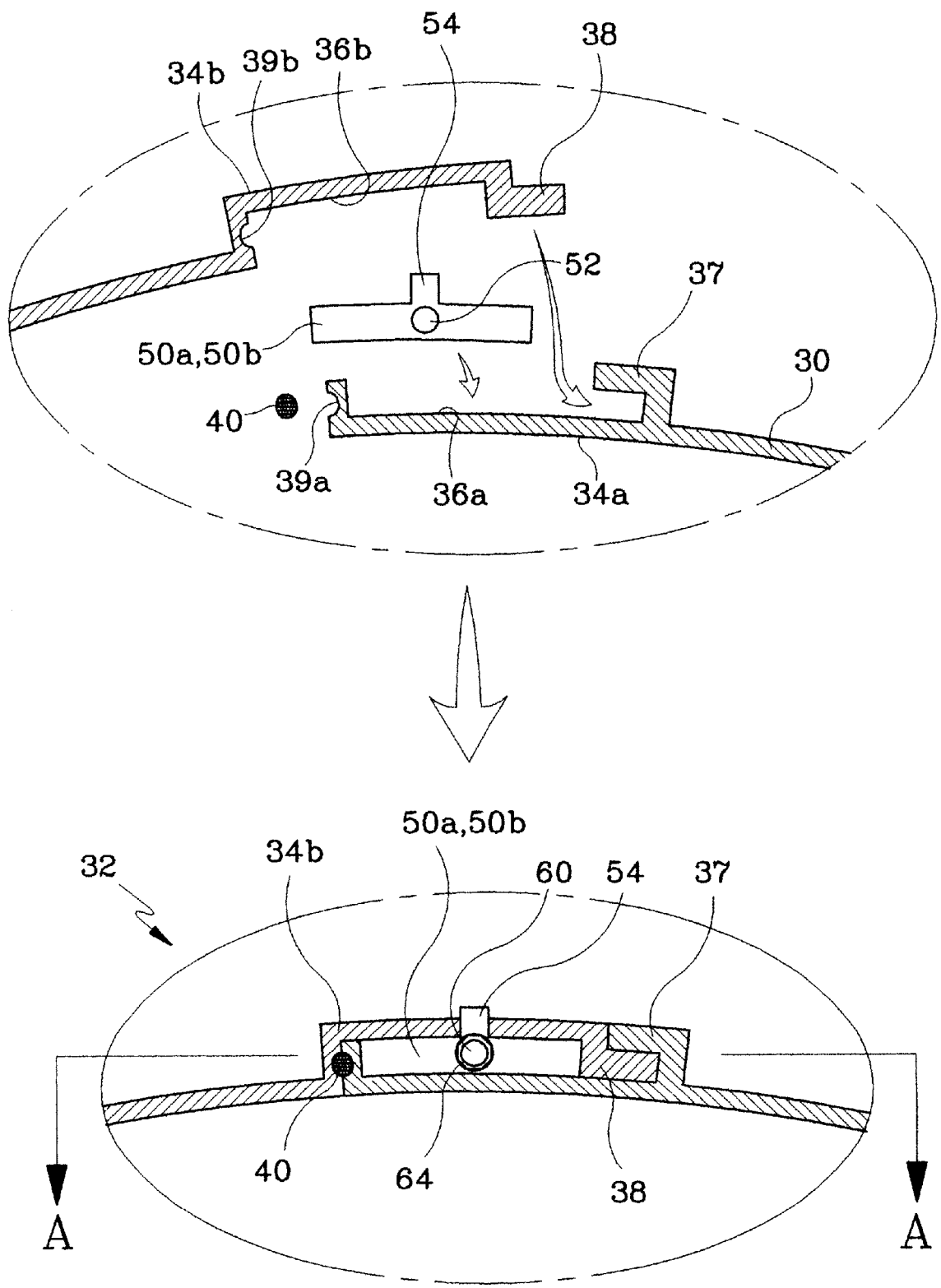
FIG. 3 is a section showing a binding apparatus for the optical fiber cable splice closure in accordance with the present invention.

The closure cover 30 is a cylindrical case cut lengthwise. Both ends of the closure cover 30 cut lengthwise form a binding apparatus 32 including an internal binding portion 34a and an external binding portion 34b which are mated with each other. As depicted in FIG. 3 and FIG. 4, the internal binding portion 34a has a first groove 36a on the upside of an end of the closure cover 30 cut lengthwise and a skirt cover 37 for covering a skirt 38 of the external binding portion 34b which has a second groove 36b on the downside of the opposite end of the closure cover 30 cut lengthwise, corresponding to the first groove 36a. The first and second grooves 36a and 36b make holes that narrow to the center when they are mated with each other. And gasket grooves 39a and 39b are formed on the outside of the internal binding portion 34a and the inside of the external binding portion 34b respectively to form a gasket hole, when they are mated with each other, through which a cover gasket 40 is inserted.

Figure 4A:
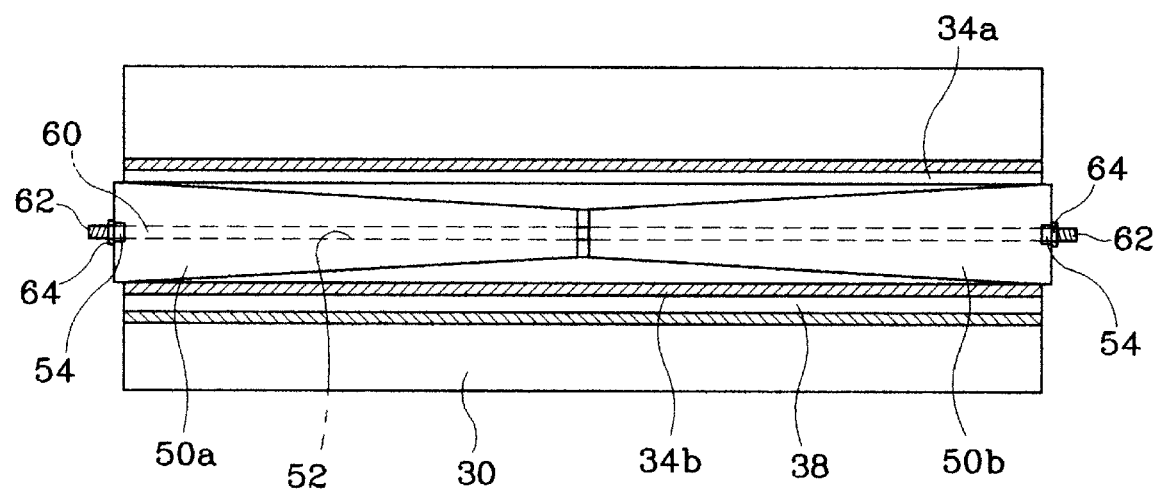
FIGS. 4a and 4b are plane sections taken along line of A—A of FIG. 3, showing the binding apparatus bound by inserting the wedge-shaped bars into the binding apparatus in accordance with the present invention.

Wedge-shaped bars 50a and 50b are inserted into the holes formed by the first and second grooves 36a and 36b when they are mated with each other. The wedge-shaped bars 50a and 50b have a symmetrical trapezoid section as depicted in FIG. 4a or an asymmetrical trapezoid section as in FIG. 4b. And the first and second grooves 36a and 36b through which the wedge-shaped bars 50a and 50b are inserted have a symmetrical trapezoid section or an asymmetrical trapezoid section corresponding to the shape of the wedge-shaped bars 50a and 50b.

Figure 4B:
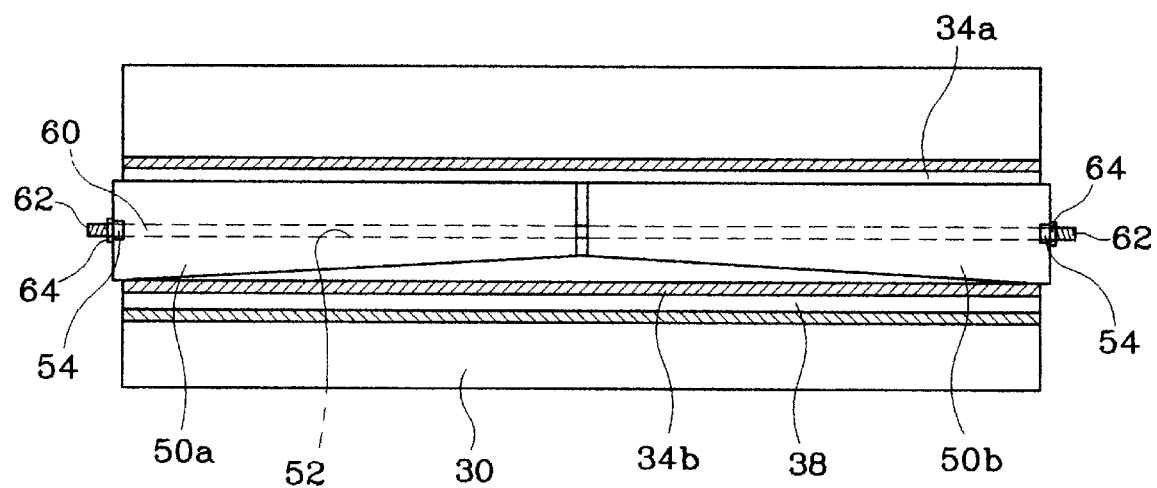

Each wedge-shaped bar, as depicted in FIG. 2, FIGS. 4a and 4b, has a clamping bar hole 52 perforated lengthwise through the middle of the bar and an eject pin 54 on the upside of one end of the wedge-shaped bar where the width is wider than the other end. A clamping bar 60, inserted into the clamping bar hole 52 to fix the wedge-shaped bars 50a and 50b, has at either end thereof threaded portions 62 that are screwed with nuts 64.

Herewith, the following description relates to the effects of the wedge-shaped binding apparatus for the optical fiber cable splice closure in accordance with the present invention.

First of all, to complete the operation of the closure for optical fiber cable splice with the binding apparatus 32 therein, closure cover 30 covers the splicer that connects optical fiber cables therein and is bound with the binding apparatus 32, after putting end cap gaskets 18 on the circumference of end caps 12 located at either end of closure cover 30. When binding the binding apparatus 32, as depicted in FIG. 3, first groove 36a of internal binding portion 34a is mated with second groove 36b of external binding portion 34b and cover gasket 40 is inserted into gasket hole formed by gasket groove 39a of first groove 36a and gasket groove 39b of second groove 36b. Then wedge-shaped bars 50a and 50b, inserted into the holes formed by first groove 36a and second groove 36b when internal binding portion 34a and external binding portion 34b are mated with each other, push either edge of first groove 36a and second groove 36b outward to be come in contact with each other tightly, thus pressing cover gasket 40 closely. At this time, skirt 38 is inserted into skirt cover 37 on first groove 36a of internal binding portion 34b to be met with each other closely. When the binding apparatus 32 has been bound as above described, the circumference of both end caps 12 are pressed, thus being covered tightly by cover gasket 40 therein. After inserting wedge-shaped bars 50a and 50b into the holes formed by first and second grooves 36a and 36b, clamping bar 60 having threaded portions 62 at either end is then inserted into clamping bar hole 52 and tightened up by nuts 64, thus wedge-shaped bars 50a and 50b bind internal binding portion 34a and external binding portion 34b and press cover gasket 40 closely so as to maintain binding state continuously.

To unbind the binding apparatus 32 of closure cover 30 to repair the splicer for optical fiber cables therein, nuts 64 at either end of the clamping bar 60 should be first unscrewed to pull out the clamping bar 60. Then wedge-shaped bars 50a and 50b are extracted, slightly hammering eject pins 54 of the wedge-shaped bars 50a and 50b outward, to unbind the binding apparatus 32 completely.

Figure 5:
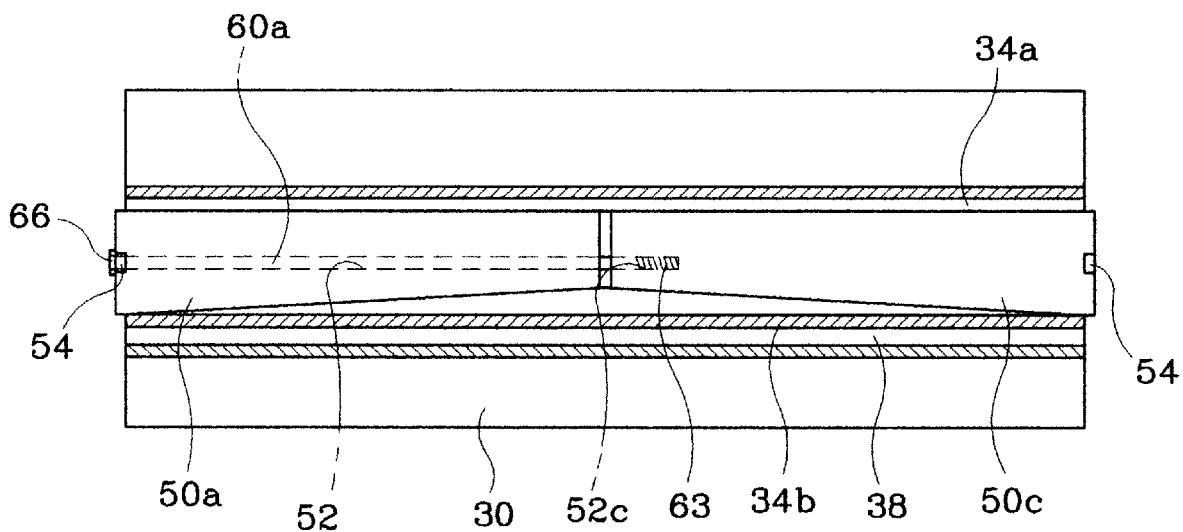
FIG. 5 is a plane section showing another embodiment of a wedge-shaped binding apparatus in accordance with the present invention.

As depicted in FIG. 5 that is a plane section showing another embodiment of a wedge-shaped binding apparatus in accordance with the present invention, one wedge-shaped bar 50a has a clamping bar hole 52 perforated lengthwise through the middle of the bar, and the other wedge-shaped bar 50c has a screw hole 52c. Clamping bar 60a for clamping wedge-shaped bars 50a and 50c has head portion 66 at one end and threaded portion 63 at the other end. In this case, threaded portion 63 is inserted into clamping bar hole 52 of one wedge-shaped bar 50a inserted into a hole formed by first and second grooves 36a and 36b, to screw into screw hole 52c of the other wedge-shaped bar 50c, thus wedge-shaped bars 50a and 50b are clamped tightly with each other.

Then wedge-shaped bars 50a and 50c, inserted into the holes formed by first groove 36a and second groove 36b, press cover gasket 40 closely, inserted into gasket hole formed by gasket grooves 39a and 39b, to maintain binding state continuously.

And to unbind the binding apparatus 32 of closure cover 30 to repair the splicer for optical fiber cables therein, threaded portion 63 that are tightening up the clamping bar 60a should be first unscrewed to pull out the clamping bar 60a from clamping bar hole 52 using head portion 66. Then wedge-shaped bars 50a and 50b are extracted, slightly hammering eject pins 54 of the wedge-shaped bars 50a and 50c outward to unbind the binding apparatus 32 completely.

As explained above, according to the wedge-shaped binding apparatus for optical fiber cable splice closure in accordance with the preferred embodiments of the present invention, it covers the closure for optical fiber cable splice tightly by inserting wedge-shaped bars 50a and 50b into the holes formed by first and second grooves 36a and 36b of internal binding portion 34a and external binding portion 34b in the binding apparatus 32. And it keeps the binding state firm and stable as the wedge-shaped bars 50a and 50b are tightened up by binding force of nuts 64 and facilitates assembling and disassembling of the closure for optical fiber cable splice as it is bound by nuts 64 with the clamping bar 60. Furthermore, the volume of the closure becomes smaller than the other's since wedge-shaped bars 50a and 50b are inserted into the inside of the binding apparatus 32 and improves in appearance accordingly.

It will be apparent to those skilled in the art that various modifications and variations can be made in the wedge-shaped binding apparatus for optical fiber cable splice closure of the present invention without departing from the spirit or scope of the invention. Thus, it is intended that the present invention cover the modifications and variations of this invention provided they come within the scope of the appended claims and their equivalents.

What is claimed is:

1. A binding apparatus installed on a closure for optical fiber cable splice comprising:

an internal binding portion having a first groove, that narrows to the center, on the upside of an end of the closure cover cut lengthwise and a skirt cover for covering a skirt formed at the opposite end of the closure cover cut lengthwise;

an external binding portion having a second groove, that narrows to the center corresponding to the first groove, on the downside of the opposite end of the closure cover cut lengthwise, and a skirt inserted into the skirt cover of the internal binding portion;

wedge-shaped bars, inserted through both ends of holes formed by the first and second grooves when they come in contact with each other to hold both ends of the internal and external binding portions, having a clamping bar hole perforated lengthwise through the middle of the bar; and a fixing means for fixing the wedge-shaped bars inserted into the holes formed by the first and second grooves when they come in contact with each other.

2. A binding apparatus installed in the closure for optical fiber cable splice according to claim 1, wherein an eject pin is formed on the each wedge-shaped bar respectively to facilitate extracting the wedge-shaped bars inserted into the holes formed by the first and second grooves when they come in contact with each other.

3. A binding apparatus installed in the closure for optical fiber cable splice according to claim 1, wherein gasket grooves are formed on the first and second grooves and a cover gasket is inserted into the gasket grooves.

4. A binding apparatus installed in the closure for optical fiber cable splice according to claim 1, wherein the fixing means includes a clamping bar hole perforated lengthwise through the middle of the wedge-shaped bars and a clamping bar, having threaded portions at either end and nuts, inserted into the clamping bar hole of the wedge-shaped bars to clamp the wedge-shaped bars inserted into the internal and external binding portion.

5. A binding apparatus installed in the closure for optical fiber cable splice according to claim 1, wherein the fixing means includes a clamping bar hole perforated lengthwise through the middle of one wedge-shaped bar, a screw hole is formed at the other wedge-shaped bar and a clamping bar, having head portion at one end and threaded portion at the other end corresponding to the screw hole, inserted into the clamping bar hole of one wedge-shaped bar and screwed with the screw hole of the other wedge-shaped bar to clamp the wedge-shaped bars.

* * * * *